Figure 1:
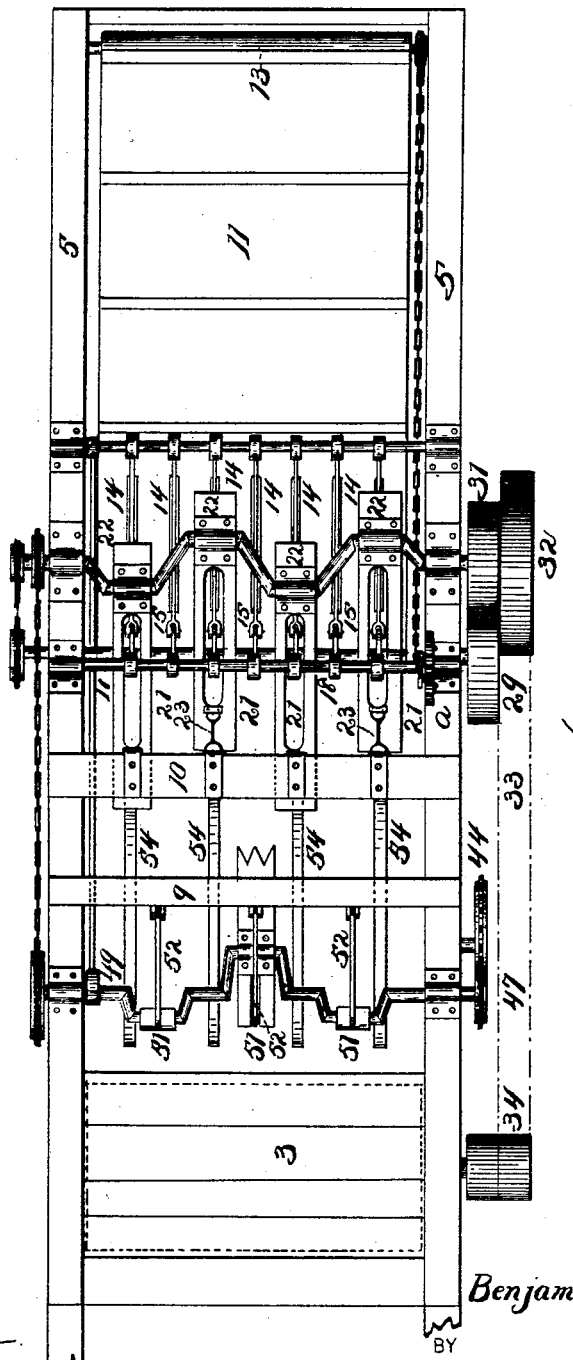

(No Model.) 3 Sheets—Sheet 1.

B. J. KIME.
BAND CUTTER AND FEEDER FOR THRESHING MACHINES.

No. 590,324. Patented Sept. 21, 1897.

WITNESSES:
Charles N. Marvin
Mary A. Franklin

INVENTOR
Benjamin J. Kime.
BY
Smith & Denison
ATTORNEYS.

(No Model.) 3 Sheets—Sheet 2.
B. J. KIME.
BAND CUTTER AND FEEDER FOR THRESHING MACHINES.
No. 590,324. Patented Sept. 21, 1897.
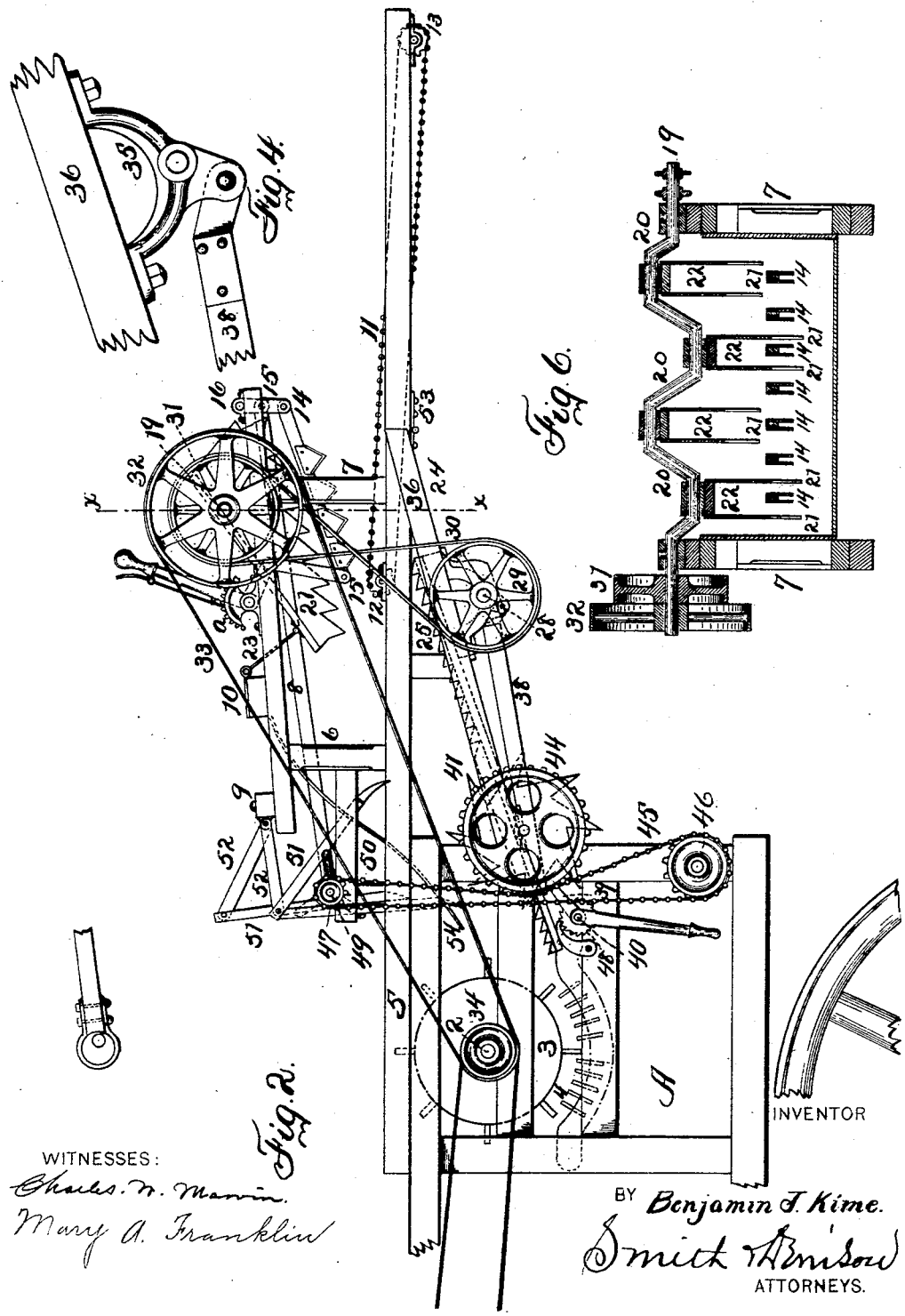
WITNESSES:
Charles N. Marvin
Mary A. Franklin
INVENTOR
BY Benjamin J. Kime
Smith & Benson
ATTORNEYS.

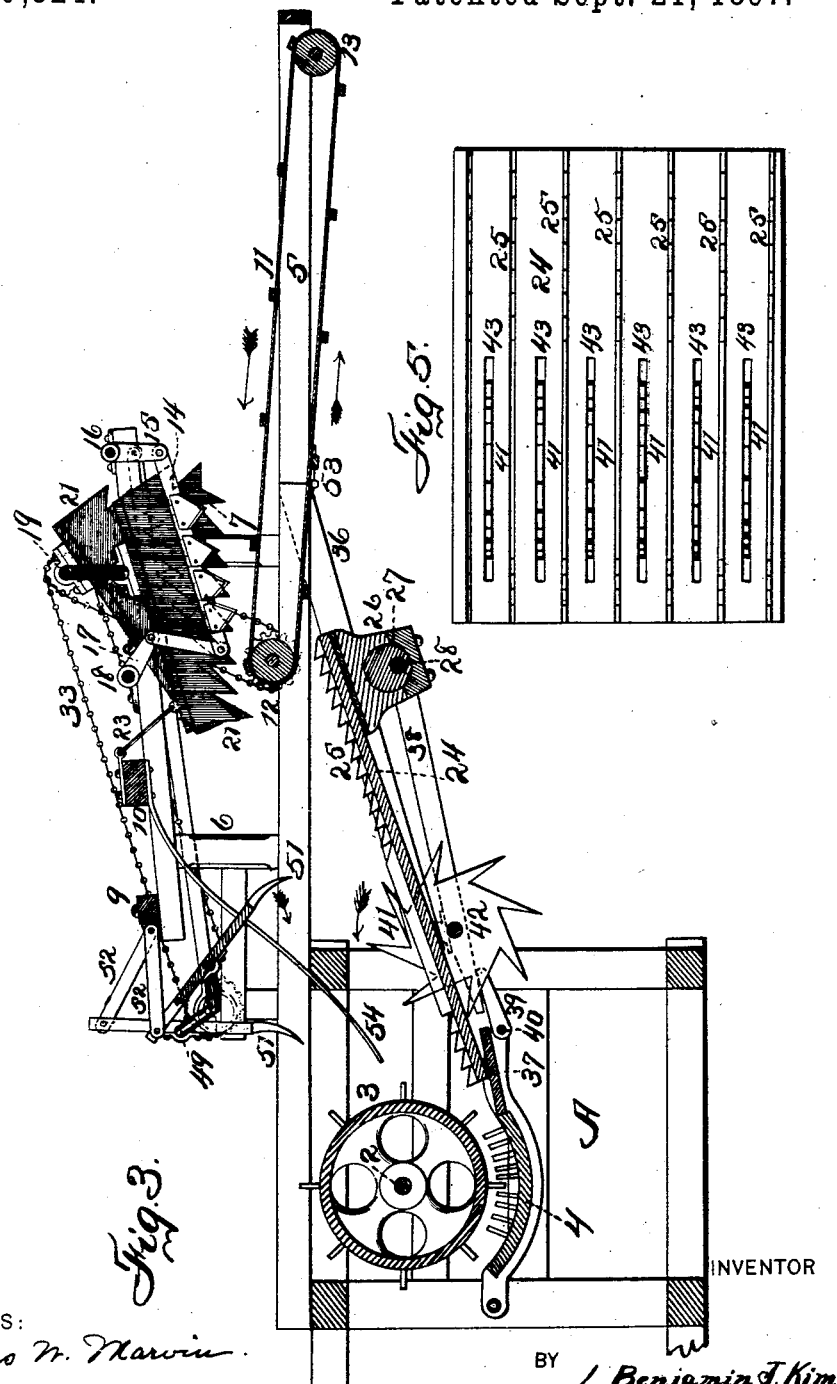

UNITED STATES PATENT OFFICE.

BENJAMIN J. KIME, OF McDOUGALL, NEW YORK.

BAND-CUTTER AND FEEDER FOR THRESHING-MACHINES.

SPECIFICATION forming part of Letters Patent No. 590,324, dated September 21, 1897.

Application filed January 20, 1897. Serial No. 619,932. (No model.)

*To all whom it may concern:*

Be it known that I, BENJAMIN J. KIME, of McDougall, in the county of Seneca, in the State of New York, have invented new and useful Improvements in Band-Cutters and Feeders for Threshing-Machines, of which the following, taken in connection with the accompanying drawings, is a full, clear, and exact description.

My invention relates to band-cutters and feeders for threshing-machines.

My object is to produce an improved band-cutter and a new feeding mechanism for threshers, the band-cutter comprising suitable knives, as sickle-blades, mounted upon a suitable body and adapted to be reciprocated, so as to cut with either movement, and suitably connected to a ratchet-lever, whereby said cutter, or all of them if several are used, can be adjusted to any desired height and also swung up out of the way when unbound grain is being threshed.

The feeding mechanism comprises a series of longitudinally-reciprocated toothed bars mounted upon the cranks of a suitable shaft, whereby they only engage with the grain to feed it in and are then raised and carried over and lowered into reëngagement therewith.

It further comprises a series of forks for feeding and spreading the grain after the bands have been cut, which also only engage with the grain to feed it in, and are then raised, carried over, and lowered into reëngagement with the grain to feed the top portion thereof into the cylinder; also, after it leaves the band-cutters or while the bands are being cut the grain falls onto or lies upon a table provided with reciprocated toothed bars, or the teeth may be secured to the table and the table reciprocated to feed the lower part of the grain forward or to draw the bundle through under the cutters.

It also comprises spring-fingers which hold the grain down on the retarding-wheels.

It also comprises the mounting of the shaking-table upon eccentrics to adjust the height of the receiving end with reference to the feed-apron and at the same time give said table a compound vertical and longitudinal movement in order to better spread and feed the grain.

It also comprises feed-retarding toothed wheels with which the lower part of the grain engages and by which it is retarded or held back to permit the top portion to be fed in first, and as said wheels are revolved in the direction of the movement of the grain, but at slow speed, the bottom or lower portion is fed in, but at a lower rate of speed, by the movement of said table, assisted more or less by the forks.

It is constructed as follows, reference being had to the accompanying drawings, in which—

Figure 1 is a top plan of the cutting and feeding mechanism as applied to a thresher. Fig. 2 is a side elevation of the same, the inclosing casing being omitted. Fig. 3 is a longitudinal vertical section thereof. Fig. 4 is an enlarged detail of the connection of the feed-board to its supporting-frame. Fig. 5 is a top plan of the feed-board and feed-retarding wheels in the slots therein. Fig. 6 is a transverse section on line X X in Fig. 2.

A is a suitable frame, part of the front of a thresher, in which a shaft 2 is journaled to drive a suitable cylinder 3, and 4 is a suitable concave mounted upon said frame in any suitable manner. Upon said frame suitable side timbers 5 are mounted, which carry the uprights 6 7, longitudinals 8, and cross-timbers 9 10.

An endless apron 11 is mounted upon rollers 12 13, journaled in or upon the timbers 5, and driven by any suitable application of power to convey the bundles under the band-cutters 14. These consist of suitable bars, upon which a number of suitable knives are mounted, as a series of mower-sickles, or a single cutter having a straight or serrated cutting edge, said bars being suspended by links 15 from a cross-rod 16 and a crank 17, connected to a rock-shaft 18, whereby said cutters are raised or lowered and set at any desired point by means of a suitable pawl-and-ratchet mechanism, as shown at *a*, whereby they can be adjusted according to the size of the bundles or elevated out of the way if the grain is loose. In whatever position they may be they are free to swing forward and back in order to give more or less of a sawing and shearing cut combined.

A shaft 19 is journaled upon the longitudinals 8 and is provided with a series of crankbends 20, arranged in any suitable manner, and 21 are toothed feeders suitably coupled to said cranks by links 22, their other ends swinging upon links 23, connected to the cross-beam 10, where, by the rotation of said shaft, said feeders are swung forward, then lowered and swung rearward, and then raised and carried forward clear of the grain, and again lowered to again engage with the grain to feed it along under the band-cutters and onto the feed-table 24. This comprises a flat plate of suitable material provided with teeth 25 in rows or otherwise pointing rearward. Its front end is mounted upon a bearing block or blocks 26, in which one or more eccentrics 27 are suitably mounted to be revolved by the shaft 28, driven by the pulley 29, belt 30 from the pulley 31 on the shaft 19, which is driven by the pulley 32, and belt 33 from the pulley 34 on the cylinder-shaft 2, the latter being driven in any suitable manner.

The eccentric-shaft 28 is suitably journaled in yokes 35, secured to timbers 36 on each side of the feed-table. The inner end of said feed-table is supported by a shelf 37, suitably supported across the frame and abutting against the front edge of the concave. The action of the eccentrics is to give said table a combined vertical and longitudinal movement, its inner end traversing said plate and its teeth feeding the grain inward.

Bars 38 are suitably hinged, Fig. 4, to the yokes 35, their outer ends being supported by arms 39 upon a shaft 40, journaled across the main frame. Feed-retarding wheels 41 are suitably mounted upon a shaft 42, journaled upon the bars 38, projecting upward through the slots 43 in the feed-board and provided with forward-projecting teeth. These wheels are driven in the direction of the feed of the grain by means of a sprocket 44 on said shaft and a belt 45 around the pulley 46 below and the pulley 47 above, power being applied in any suitable manner to drive said belt. The teeth of these wheels engage with and retard or hold back the lower portion of the grain, but at the same time permit it to be fed forward slower than the upper portion, thus spreading the grain and insuring an even and uniform feed to the cylinder and avoiding all danger of clogging or feeding too much into the cylinder at any time. The upward projection of these wheels is varied as desired by partially rotating the shaft 40 and swinging the arms 39 to raise or lower the rear ends of the bars 38 and set at any desired point by means of the ratchet and pawl 48.

The pulley 47 is mounted upon a crank-shaft 49, journaled upon the frame-bars 50, and 51 are suitable feed-forks journaled upon the cranks of said shaft and having their upper ends suitably connected by links 52 to the cross-bar 9, whereby the rotation of said shaft swings said forks rearward to feed the top portion of the grain into the cylinder, then raises them, swings them over forward, and lowers them into reëngagement with the grain.

The forward ends of the bars 5 consist of sections hinged together, as at 53, and provided with suitable means for locking them in their extended position, as in Fig. 2, when in use, and adapted to be unlocked to permit the front end of the timbers and feed-apron to drop down or be swung under during transportation of the thresher.

Suitable spring-fingers 54 are connected to the bar 10 and arranged in alternation with the forks 51 and operate to hold the grain down and guide it to properly enter the cylinder-chamber and pass under the cylinder.

A reciprocatory movement is imparted to the band-cutting knives 14 by means of a rod 55, connected to a link 15 and mounted upon an eccentric 56 upon the shaft 49.

Having described my invention, what I claim, and desire to secure by Letters Patent, is—

In a band-cutting and feeding attachment for threshers, a feed-apron, swinging and adjustable band-cutters above said apron, swinging feed-bars provided with teeth, also above said apron and arranged in alternation with said knives, in combination with a reciprocating and oscillating feed-board, swinging feed-forks above it, and toothed feed-retarding wheels projecting above the feed-board and rotating in the direction of the feed toward the threshing mechanism.

In witness whereof I have hereunto set my hand this 2d day of January, 1897.

BENJAMIN J. KIME.

In presence of—
DANIEL KIME,
GEO. E. ZARTMAN.